May 21, 1957
W. COSS
2,792,647
DECORATING MODEL
Filed Aug. 25, 1953
2 Sheets-Sheet 1
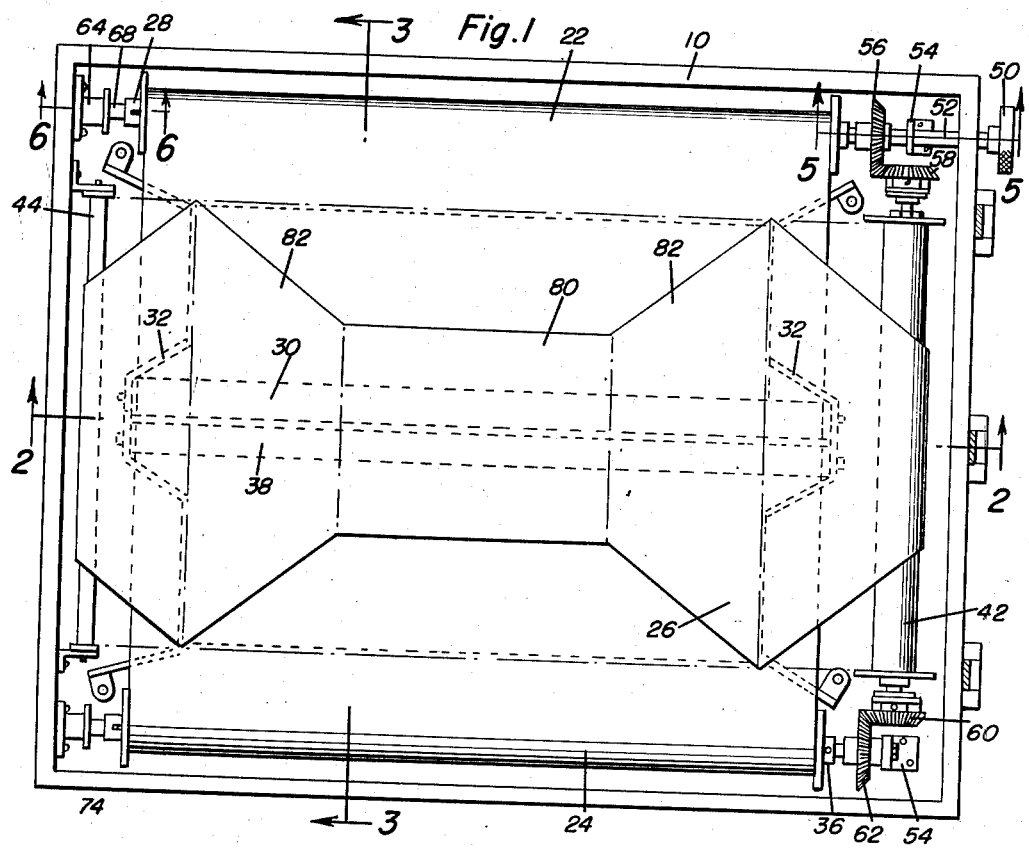
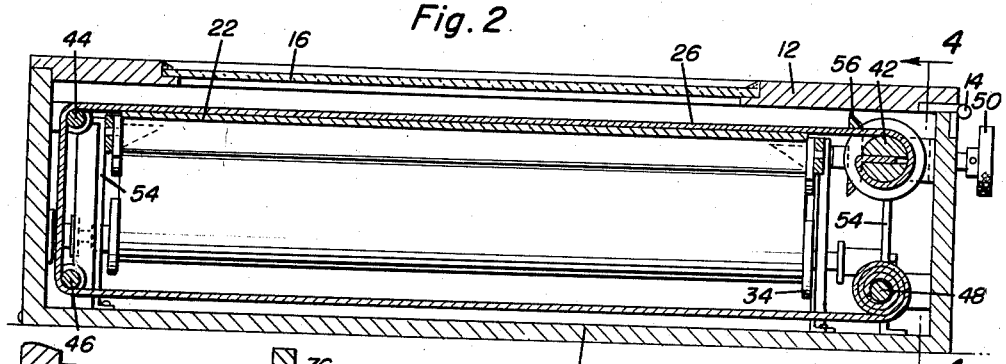
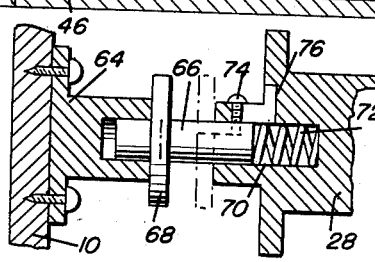
William Coss
INVENTOR.
BY *Clarence A. O'Brien
and Harvey B. Jacobson*
Attorneys May 21, 1957

W. COSS 2,792,647

DECORATING MODEL

Filed Aug. 25, 1953

William Coss
INVENTOR.

BY *Clarence A. O'Brien*
and *Harvey B. Jacobson*
Attorneys

United States Patent Office

2,792,647
Patented May 21, 1957

2,792,647

DECORATING MODEL

William Coss, Little Falls, N. Y.

Application August 25, 1953, Serial No. 376,384

2 Claims. (Cl. 35—50)

This invention relates to a decorating model providing moving colored panels for comparative study of various color schemes used in interior decoration prior to the purchase of paint by a customer.

An object of this invention is to provide a decorator model having changeable color combinations of paint or paper to be used in interior decoration wherein the movable components simulate a floor, ceiling, and walls of a room when viewed in their entirety.

A further object of this invention is to provide a simulated interior of a room having changeable color combinations and further providing joint lines between a ceiling, walls, and floor to provide a decorator's perspective of the interior of the room.

An important object of this invention is to provide a compact decorator model having a viewing glass and movable panels thereunder for showing various decoration schemes for the interior of a room to prospective customers.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top plan view showing the box like structure of the decorator model with the top removed and the relationship of the rollers for the color sheets or panels;

Figure 2 is a vertical, longitudinal section taken substantially along section line 2—2 of Figure 1 showing details of the wall color panel and actuating rollers therefor;

Figure 6 is a fragmental vertical section detail taken substantially along section line 6—6 of Figure 1 showing means for removing the rollers;

Referring now more specifically to Figures 1 and 2 of the drawings, it will be seen that the numeral 10 generally designates a rectangular box like supporting frame, the numeral 12 designates a top or closure for said box and hinged thereto along one edge by the use of hinges 14.

Figure 7:
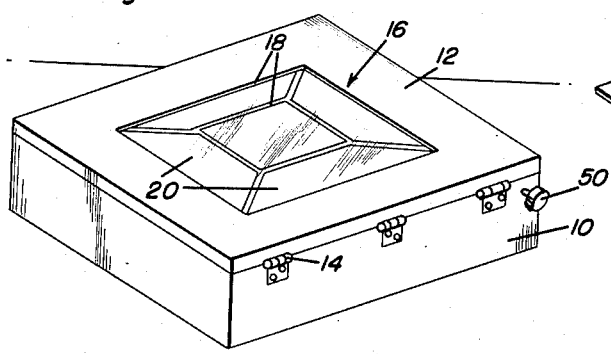
Figure 7 is a perspective of the box like structure showing the viewing glass.

Referring now more specifically to Figure 7, the top 12 has a transparent viewing glass 16 mounted in its center and provided with index lines 18 which simulate the joint lines between the ceiling, three side walls, and the floor of a room in a decorator's perspective view. As a prospective customer looks through a viewing glass 16 the panels 20 which are isolated by the index lines 18 are superimposed over various colors thereby giving the prospective customer a comparative study of different decorating schemes enabling him to more easily select such color combinations as desired.

Figure 3:
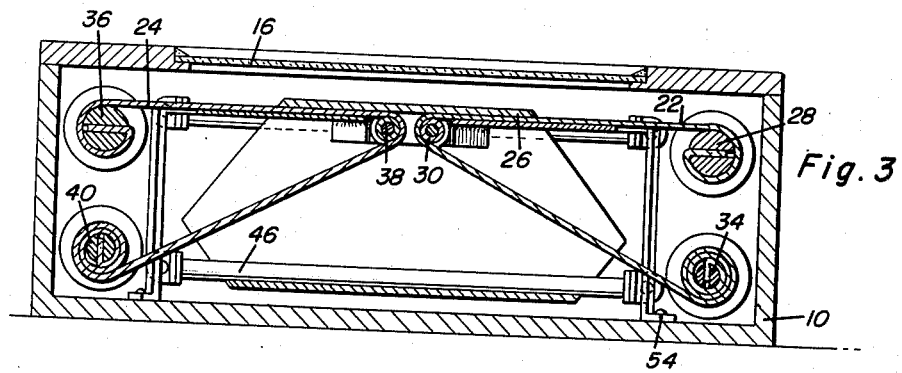
Figure 3 is a vertical transverse section taken substantially along line 3—3 of Figure 1 showing details of the floor and ceiling color panels and actuating rollers therefor.

As will be seen in Figure 1 a movable ceiling panel 22 is mounted adjacent one side of the box like frame 10 and a floor panel 24 is mounted adjacent an opposite side of the frame 10, mounted for movement between the panels 22 and 24 is a wall forming panel 26. As more clearly seen in Figure 3 the panel 22 is secured to a roller 28 and extends in a horizontal direction to a point adjacent the middle of the box like frame 10 and thence over a roller 30 which is journaled on upstanding brackets 32 which are secured to the bottom of the frame member 10, the panel 22 then proceeds downwardly and is secured to a roller 34 which is vertically spaced below roller 28. The floor panel 24 is secured to an upper roller 36 and extends in a horizontal direction to approximately the center of the box 10 and passes over an idler roller 38 and thence downwardly and rearwardly to a roller 40 which is located vertically below the roller 36. The arrangement of rollers for the movable panels 22 and 24 are substantially identical.

Figure 4:
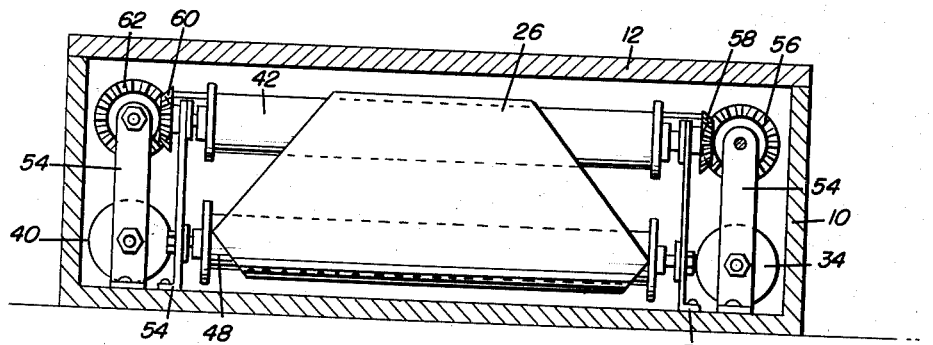
Figure 4 is a vertical transverse section taken substantially along section line 4—4 of Figure 2 showing details of the actuating rollers.
Figure 5:
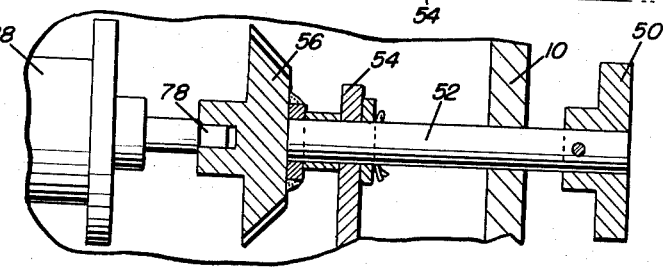
Figure 5 is a fragmental vertical section detail taken substantially along section line 5—5 of Figure 1 showing details of the operating knob and driving gear.

As more clearly seen in Figures 2 and 4, it will be seen that the wall forming panel 26 is secured to a roller 22 and extends in a horizontal direction completely across the upper portion of the box like frame 10 and passes over an idler roller 44 and thence downwardly parallel to the side edge of the box like frame 10 and over a second idler roller 46 and then proceeds in a horizontal direction back across the box 10 and attached to a roller 48 which is positioned below the roller 42. As will be seen in Figure 1 in general and detailed in Figure 5, a manually operating knob 50 has a projecting portion 52 passing through a side wall of the box like frame 10 and journaled in an upstanding lug 54 which is secured to the bottom of the box member 10. Secured to the projecting portion 52 in spaced relation to the lug 54 is a bevel drive gear 56 which is non-rotatively connected to the roller 28 and engages a complementary bevel gear 58 which is non-rotatively attached to roller 42. On the opposite end of roller 42 from the gear 58 is non-rotatively attached a bevel gear 60 which is in meshing engagement with a bevel gear 62 that is non-rotatively attached to the roller 36. As will be clearly seen by turning the knob 50 and the gear 56 each of rollers 38, 42 and 36 will be rotated thereby moving the panel members 22, 24 and 26.

Now referring specifically to Figure 6, it will be seen that the rollers 28 and 36 along with panels 22 and 24 may be removed and other panels or rollers may be inserted therefor. The rollers 28 and 36 are journaled in a bearing stud 64 secured to a side wall 10 by the use of a horizontally sliding stud 66 which has a bearing abutting flange 68 and the rollers 28 or 36 have a socket 70 for receiving the slidable stud 66 and a coil spring 72 which urges the sliding stud 66 into the bearing stud 64 until the flange 68 is in contact with the outer surface of the bearing stud 64. To maintain a sliding stud 66 in its socket 70, the stud 66 has a projecting screw 74 slidably received in a slot 76 which limits movement of the sliding stud 66. As will be seen, a person desiring to remove the roller simply grasps the flange 68 and pulls toward the roller 28 thereby disengaging the sliding stud 66 from the bearing stud 64 and also disengaging the slidable and non-rotative connection 78 between the roller 28 and the drive bevel gear 56. As will be seen clearly in Figure 4 each of the rollers 28, 34, 42, 48, 36 and 40 are journaled in upstanding lug members which are identical to member 54, such lug members 54 are all secured to the bottom of the box like frame 10.

Figure 8:
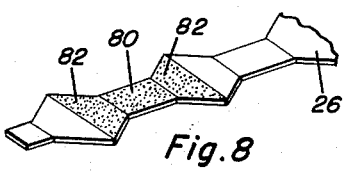
Figure 8 is a detail perspective showing the wall color panel.

Referring now more specifically to Figure 8 the specific shape of the wall forming panel 26 is illustrated with the colored portion 80 denoting a back wall and the colored portions 82 representing a side wall respectively of the interior of a room. Due to the specific shape and construction of panel 26 and the specific orientation of the panels 22 and 24, the overlapping joint line between these panels may be coincided with the index lines 18 on the viewing glass 16 by manipulating the operating knob 50. The panel members 22, 24 and 26 may be colored or decorated in any desired combination along certain portions of the panel and other desired combinations along other portions of the panels and by manipulation of the knob 50 various decorating combinations may be brought into view and compared.

As is obvious from the disclosure the panels may be changed as desired by the operator and the various panels may vary according to the desires of the exhibitor. The device is compact and easily manipulated and may be provided with a large number of various color combinations thereby simplifying the work of the interior decorator when displaying decorating schemes to prospective customers.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A decorating model comprising an enclosed cabinet, an enlarged transparent viewing panel mounted in a wall of said cabinet, said panel being generally rectangular and provided with distinguishable division lines defining a central rectangular area with a radial division line extending from each corner of the central area to the adjacent corner of the panel thereby simulating a planar perspective view of the interior of a room as seen from eye level, said central area representing the rear wall with the trapezoidal areas between the periphery of the central area and edges of the panel representing the ceiling, side walls and floor of a room, a movable flexible member underlying the ceiling area, a movable flexible member underlying the floor area, a movable flexible member underlying the central area and the side wall areas, said flexible member underlying the central area and the side wall areas including a plurality of continuous sections of different colors with each section having a generally rectangular central portion and trapezoidal end portions having diverging side edges coinciding with the radial division lines on the viewing panel when the central portion underlies the central area of the viewing panel, the flexible member underlying the ceiling area having an inner end portion extending inwardly of and underlying the adjacent edge of the flexible member underlying the central area and side wall areas of the viewing panel, the flexible member underlying the floor area of the viewing panel having an inner end portion extending inwardly of and underlying the adjacent edge of the flexible member underlying the central area and side wall areas of the viewing panel, each of said flexible members being in the form of a strip of colored flexible material mounted on end rollers, means for actuating said rollers for moving the flexible members in relation to the viewing panel for changing the portions of the flexible members viewable under the viewing panel, the portions of said flexible members underlying the viewing panel lying in substantially the same plane in generally parallel relation to the viewing panel.

2. The combination of claim 1, wherein said means for actuating the mounting rollers being independently operative for permitting independent adjustment of the portions of the strips of material underlying the viewing panel.

References Cited in the file of this patent

UNITED STATES PATENTS

| | | |
|---|---|---|
| 863,661 | Schmidt | Aug. 20, 1907 |
| 921,713 | Johnson | May 18, 1909 |
| 1,788,511 | Fenimore | Jan. 13, 1931 |
| 1,853,615 | Howard | Apr. 12, 1932 |
| 2,291,257 | Rider | July 28, 1942 |
| 2,317,336 | Adams | Apr. 20, 1943 |
| 2,631,390 | Dorogoff | Mar. 17, 1953 |
| 2,723,475 | Santamaria | Nov. 15, 1955 |
| 2,752,705 | Ebersold | July 3, 1956 |

FOREIGN PATENTS

| | | |
|---|---|---|
| 436,601 | Great Britain | Oct. 15, 1935 |
| 667,637 | Great Britain | Mar. 5, 1952 |